United States Patent
Osugi

(10) Patent No.: US 8,847,542 B2
(45) Date of Patent: Sep. 30, 2014

(54) DEVICE AND METHOD FOR CONTROLLING MOTOR

(75) Inventor: Ryosuke Osugi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 133 days.

(21) Appl. No.: 13/696,498

(22) PCT Filed: May 27, 2010

(86) PCT No.: PCT/JP2010/058976
§ 371 (c)(1),
(2), (4) Date: Nov. 6, 2012

(87) PCT Pub. No.: WO2011/148485
PCT Pub. Date: Dec. 1, 2011

(65) Prior Publication Data
US 2013/0049666 A1     Feb. 28, 2013

(51) Int. Cl.
H02P 27/04   (2006.01)
H02M 1/44    (2007.01)
H02P 27/08   (2006.01)

(52) U.S. Cl.
CPC H02M 1/44 (2013.01); H02P 27/08 (2013.01)
USPC ......................................................... 318/807

(58) Field of Classification Search
CPC ............. H02P 27/06; H02P 27/08; B60K 6/20
USPC .......... 318/400.01, 400.14, 400.15, 599, 700,
318/721, 727, 799, 801, 807, 811, 430, 432,
318/437; 341/181
See application file for complete search history.

(56) References Cited

U.S. PATENT DOCUMENTS

| | | | |
|---|---|---|---|
| 7,923,961 B2 * | 4/2011 | Takamatsu et al. | 318/811 |
| 7,928,686 B2 * | 4/2011 | Saha et al. | 318/807 |
| 2008/0298785 A1 | 12/2008 | Patel et al. | |
| 2011/0153133 A1 | 6/2011 | Asahara et al. | |

FOREIGN PATENT DOCUMENTS

| | | |
|---|---|---|
| JP | 02-211092 A | 8/1990 |
| JP | 2004-048844 A | 2/2004 |
| JP | 2005-278281 A | 10/2005 |
| JP | 2007-020320 A | 1/2007 |
| JP | 2008-099475 A | 4/2008 |
| WO | 2010/023768 A1 | 4/2010 |
| WO | 2011/155013 A1 | 12/2011 |

* cited by examiner

Primary Examiner — Antony M Paul
(74) Attorney, Agent, or Firm — Sughrue Mion, PLLC

(57) ABSTRACT

In order to lower electromagnetic noise, normally, a carrier frequency of a inverter or controlling drive of a motor mounted on an electrically powered vehicle is changed periodically or randomly within a first frequency range set in advance, as the time elapses. While a vehicle speed is low, the carrier frequency is changed periodically or randomly within a second frequency range set in advance to be wider than the first frequency range and to be equal in central frequency to the first frequency range, as the time elapses. The second frequency range is set to include a resonant frequency of a specific mechanical oscillation system higher in electromagnetic noise generated at a natural resonant frequency, among a plurality of mechanical oscillation systems formed by equipment mounted on the electrically powered vehicle. On the other hand, the first frequency range is set not to include the resonant frequency.

6 Claims, 9 Drawing Sheets

DEVICE AND METHOD FOR CONTROLLING MOTOR

CROSS REFERENCE TO RELATED APPLICATIONS

This application is a National Stage of International Application No. PCT/JP2010/058976 filed May 27, 2010, the contents of all of which are incorporated herein by reference in their entirety.

TECHNICAL FIELD

This invention relates to a device and a method for controlling a motor, and more particularly to control of a carrier frequency used for controlling a motor.

BACKGROUND ART

Pulse width modulation control (PWM control) has conventionally been applied to a power converter (an inverter) for controlling drive of an alternating-current motor.

Japanese Patent Laying-Open No. 2004-48844 (PTL 1) describes relation between a carrier frequency and volume of noise and power loss in an inverter to which pulse width modulation control is applied. Specifically, as a carrier frequency is lowered, volume of noise originating from the inverter becomes high while switching loss decreases. In contrast, according to the description, as a carrier frequency is higher, volume of noise becomes low while loss in a switching element increases. PTL 1 describes control for setting a high carrier frequency when an engine speed is low and lowering a carrier frequency when an engine speed is high, in order to improve fuel efficiency without giving any uncomfortable feeling to the sense of hearing of a person in a hybrid vehicle.

In addition, Japanese Patent Laying-Open No. 2005-278281 (PTL 2) describes control for lowering a carrier frequency to an audible frequency band when such an obstacle as a pedestrian is sensed, as a vehicle control device for notifying a pedestrian of presence of a vehicle.

Meanwhile, Japanese Patent Laying-Open No. 2007-20320 (PTL 3) and Japanese Patent Laying-Open No. 2008-99475 (PTL 4) exist as techniques for lowering noise caused by PWM control.

PTL 3 describes a PWM inverter device for lowering noise in terms of the sense of hearing without increasing loss. Specifically, according to the description, a carrier frequency determining a frequency of a PWM pulse is caused to periodically or randomly fluctuate only within a prescribed frequency range with any carrier frequency being defined as the center. In addition, PTL 3 describes change in range of fluctuation of this carrier frequency based on a motor current value or a frequency command value.

Japanese Patent Laying-Open No. 2008-99475 (PTL 4) describes discrete and periodic change in carrier frequency over time in order to level noise spectra in a desired frequency band in control of a power conversion device. Then, according to the description, a value for a carrier frequency to be changed is determined such that frequencies of harmonics are not superimposed on each other.

CITATION LIST

Patent Literature

PTL 1: Japanese Patent Laying-Open No. 2004-48844
PTL 2: Japanese Patent Laying-Open No. 2005-278281
PTL 3: Japanese Patent Laying-Open No. 2007-20320
PTL 4: Japanese Patent Laying-Open No. 2008-99475

SUMMARY OF INVENTION

Technical Problem

In such an electrically powered vehicle as a hybrid car, a fuel cell car, and an electric car that can run with driving force from a motor, it has been pointed out that, since sound generated by a vehicle when it runs only with driving force from the motor is low, a pedestrian or the like is less likely to recognize a vehicle approaching.

According to PTL 2, electromagnetic noise in an audible frequency band can be generated as additional operating sound, by lowering a carrier frequency without newly providing an alarm generation device or the like. Thus, it is expected that a pedestrian or the like will be notified of a vehicle approaching.

Meanwhile, it has been known that a harmonic current (a ripple current) in accordance with a carrier frequency is superimposed on a current supplied from an inverter to a motor. Therefore, as the carrier frequency is lower, the ripple current becomes higher, which leads to great fluctuation in magnetic field. Then, an eddy current produced in a stator becomes high. Consequently, increase in iron loss increases power loss, which results in lower efficiency of the motor. In particular in a permanent magnet type motor, increase in eddy current leads to increase in temperature of a magnet and further to occurrence of demagnetization. Thus, efficiency of the motor may further be lowered.

Therefore, in carrier frequency control according to PTL 2, a carrier frequency is lowered in a fixed manner while operating sound is generated. Thus, if frequency of application of carrier frequency control is high, lowering in efficiency of the motor may lead to poorer fuel efficiency.

This invention was made to solve such problems, and an object of this invention is to make operating sound of an electrically powered vehicle louder by controlling a carrier frequency used for controlling a motor, without lowering in fuel efficiency due to lowering in efficiency of the motor.

Solution To Problem

In one aspect of this invention, a device for controlling a motor mounted on an electrically powered vehicle includes a motor command operation unit, a carrier generation unit, a carrier frequency control unit, and a pulse width modulation unit. The motor command operation unit is configured to generate a control command for a voltage or a current to be supplied to the motor from a power converter configured to include at least one switching element. The carrier generation unit is configured to generate a carrier signal used for controlling the power converter. The carrier frequency control unit carries out such control that frequencies of a plurality of carrier signals generated by the carrier generation unit are caused to fluctuate within a first frequency range with a prescribed frequency being defined as a center while a vehicle speed of the electrically powered vehicle is higher than a prescribed speed and the frequencies are caused to fluctuate within a second frequency range with the prescribed frequency being defined as the center while the vehicle speed is lower than the prescribed speed. The pulse width modulation unit is configured to control on and off of the switching element in the power converter based on comparison between the control command from the motor command operation unit and the carrier signal from the carrier generation unit.

Equipment mounted on the electrically powered vehicle forms a plurality of mechanical oscillation systems generating sound as a result of oscillation by electromagnetic oscillation originating from the carrier signal. Then, the first and second frequency ranges are set such that sound generated from the plurality of mechanical oscillation systems at the time when the carrier frequency fluctuates within the second frequency range is louder than sound generated from the plurality of mechanical oscillation systems at the time when the carrier frequency fluctuates within the first frequency range.

Preferably, the carrier frequency control unit causes the frequency of the carrier signal to fluctuate within the first frequency range in accordance with a first period of change when the vehicle speed of the electrically powered vehicle is higher than the prescribed speed and causes the frequency of the carrier signal to fluctuate within the second frequency range in accordance with a second period of change when the vehicle speed of the electrically powered vehicle is lower than the prescribed speed. The second period of change is longer than the first period of change.

In another aspect of this invention, a method for controlling a motor mounted on an electrically powered vehicle includes the steps of controlling frequencies of a plurality of carrier signals used for control of a power converter configured to include at least one switching element, generating the carrier signal in accordance with a carrier frequency determined in the controlling step, generating a control command for a voltage or a current to be supplied from the power converter to the motor, and generating a signal for controlling on and off of the switching element based on comparison between the control command and the carrier signal. The step of controlling includes the steps of causing the carrier frequency to fluctuate within a first frequency range with a prescribed frequency being defined as a center while a vehicle speed of the electrically powered vehicle is higher than a prescribed speed and causing the carrier frequency to fluctuate within a second frequency range with the prescribed frequency being defined as the center while the vehicle speed is lower than the prescribed speed. The electrically powered vehicle incorporates a plurality of pieces of equipment having a mechanism serving as a sound source based on mechanical oscillation. The first and second frequency ranges are set such that sound generated from a plurality of mechanical oscillation systems at the time when the carrier frequency fluctuates within the second frequency range is louder than sound generated from the plurality of mechanical oscillation systems at the time when the carrier frequency fluctuates within the first frequency range.

Preferably, the step of controlling includes the steps of causing the carrier frequency to fluctuate within the first frequency range in accordance with a first period of change while the vehicle speed of the electrically powered vehicle is higher than the prescribed speed and causing the carrier frequency to fluctuate within the second frequency range in accordance with a second period of change while the vehicle speed is lower than the prescribed speed. The second period of change is longer than the first period of change.

Preferably, the first and second frequency ranges are set such that any resonant frequency of the plurality of mechanical oscillation systems is out of the first frequency range and within the second frequency range.

Advantageous Effects Of Invention

According to this invention, operating sound of an electrically powered vehicle is made louder by controlling a carrier frequency used for controlling a motor, without lowering in fuel efficiency due to lowering in efficiency of the motor.

DESCRIPTION OF EMBODIMENTS

Figure 1:
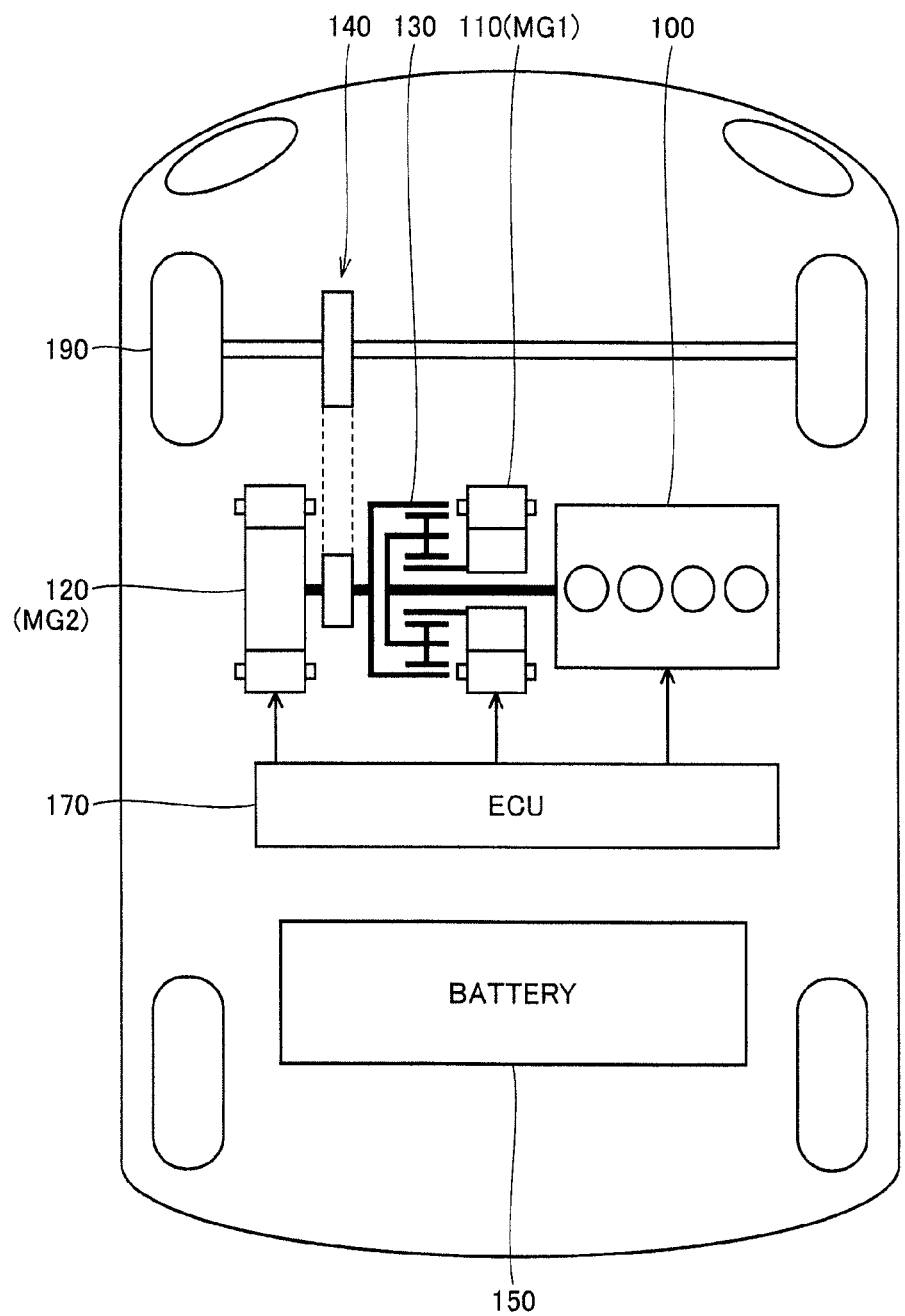
FIG. 1 is a schematic block diagram illustrating an overall construction of a hybrid car representing one example of an electrically powered vehicle to which a device for controlling a motor according to an embodiment of the present invention is applied.

An embodiment of the present invention will be described hereinafter in detail with reference to the drawings. In the drawings below, the same or corresponding elements have the same reference characters allotted and description thereof will not be repeated in principle.

FIG. 1 is a schematic block diagram illustrating an overall construction of a hybrid car representing one example of an electrically powered vehicle to which motor control according to an embodiment of the present invention is applied. It is noted that an electrically powered vehicle is collective denotation of a vehicle including a vehicle driving force generation source (representatively, a motor) using electric energy, such as a hybrid car, an electric car, and a fuel cell car.

Referring to FIG. 1, a hybrid car includes an engine 100, a first motor generator 110 (hereinafter simply also referred to as an "MG1"), a second motor generator 120 (hereinafter simply also referred to as an "MG2"), a power split device 130, a reduction gear 140, and a battery 150. Each of MG1 and MG2 corresponds to a "motor" which is to be subjected to motor control according to the embodiment of the present invention.

The hybrid car shown in FIG. 1 runs with driving force from at least one of engine 100 and MG2. Engine 100 and MG1 and MG2 are connected to one another through power split device 130. Motive power generated by engine 100 is split into two paths by power split device 130. One is a path for driving a drive wheel 190 through reduction gear 140. The other is a path for generating power by driving MG1.

Each of MG1 and MG2 is representatively a three-phase alternating-current rotating electric machine. MG1 generates power with motive power from engine 100 resulting from splitting by power split device 130. Power generated by MG1 is used depending on a state of running of a vehicle or an SOC (State of Charge) of battery 150. For example, during normal running, power generated by MG1 serves as power for driving MG2 as it is. On the other hand, when SOC of battery 150 is lower than a predetermined value, power generated by MG1 is converted from alternating-current to direct-current by an inverter which will be described later. Thereafter, a voltage is regulated by a converter which will be described later and the resultant voltage is stored in battery 150.

While MG1 is serving as a generator, MG1 generates negative torque. Here, negative torque refers to such torque as serving as load on engine 100. While MG1 is serving as a motor as it receives supply of power, MG1 generates positive torque. Here, positive torque refers to such torque as not serving as load on engine 100, that is, torque as assisting rotation of engine 100. This is also the case with MG2.

MG2 is implemented representatively by a three-phase alternating-current rotating electric machine. MG2 is driven by at least one of power stored in battery 150 and power generated by MG1.

Driving force from MG2 is transmitted to drive wheel 190 through reduction gear 140. Thus, MG2 assists engine 100 or runs the vehicle by using driving force from itself.

During regenerative braking of a hybrid car, MG2 is driven by drive wheel 190 through reduction gear 140, so as to operate as a generator. Thus, MG2 operates as a regenerative brake for converting braking energy into power. Power generated by MG2 is stored in battery 150.

Power split device 130 is made of a planetary gear including a sun gear, a pinion gear, a carrier, and a ring gear. The pinion gear is engaged with the sun gear and the ring gear. The carrier supports the pinion gear such that it can revolve. The sun gear is coupled to a rotation shaft of MG1. The carrier is coupled to a crankshaft of engine 100. The ring gear is coupled to a rotation shaft of MG2 and reduction gear 140.

Figure 2:
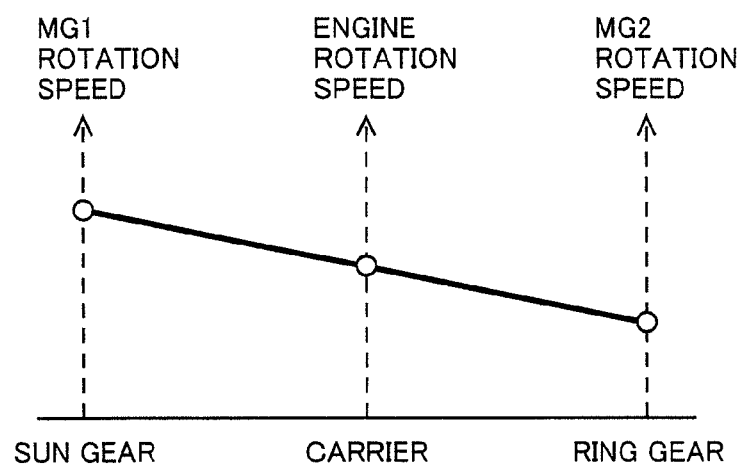
FIG. 2 is a nomographic chart showing relation among rotation speeds of an engine and motor generators in the hybrid car in FIG. 1.

As engine 100 and MG1 and MG2 are coupled to one another through power split device 130 made of the planetary gear, rotation speeds of engine 100 and MG1 and MG2 satisfy relation as connected with a straight line in the nomographic chart as shown in FIG. 2.

In an operation region where efficiency of engine 100 is low such as at the time of start or while a vehicle speed is low, the hybrid car shown in FIG. 1 basically runs only with driving force from MG2 with engine 100 being stopped. Then, during normal running, engine 100 is operated in a region of high efficiency and motive power of engine 100 is split into two paths by power split device 130. Motive power transmitted to one path drives drive wheel 190. Motive power transmitted to the other path drives MG1 to thereby generate power. Here, by outputting motive power by using power generated by MG1, MG2 assists drive of drive wheel 190. During running at a high speed, power from battery 150 is further supplied to MG2 to thereby increase motive power from MG2, so that driving force is additionally provided to drive wheel 190.

On the other hand, during deceleration, MG2 driven by drive wheel 190 functions as a generator to thereby generate power based on regenerative braking. Power recovered through regeneration is charged to battery 150. It is noted that regenerative braking herein includes braking accompanying regeneration when a driver driving a hybrid car operates a foot brake, and deceleration (or stop of acceleration) of a vehicle while carrying out regeneration, in which an accelerator pedal is off during running although a foot brake is not operated.

Referring back to FIG. 1, battery 150 is a battery assembly constituted of a plurality of secondary battery cells (not shown). A voltage of battery 150 is, for example, around 200 V. Battery 150 may be charged not only with power generated by MG1 and MG2 but also power supplied from a power supply outside the vehicle.

Engine 100 and MG1 and MG2 are controlled by an ECU (Electronic Control Unit) 170. It is noted that ECU 170 may be divided into a plurality of ECUs.

ECU 170 is configured with a not-shown CPU (Central Processing Unit) and an electronic control unit containing a memory, and it is configured to perform operation processing using a detection value from each sensor based on a map and a program stored in the memory. Alternatively, at least a part of the ECU may be configured to perform prescribed mathematical/logical operation processing with such hardware as electronic circuits.

Figure 3:
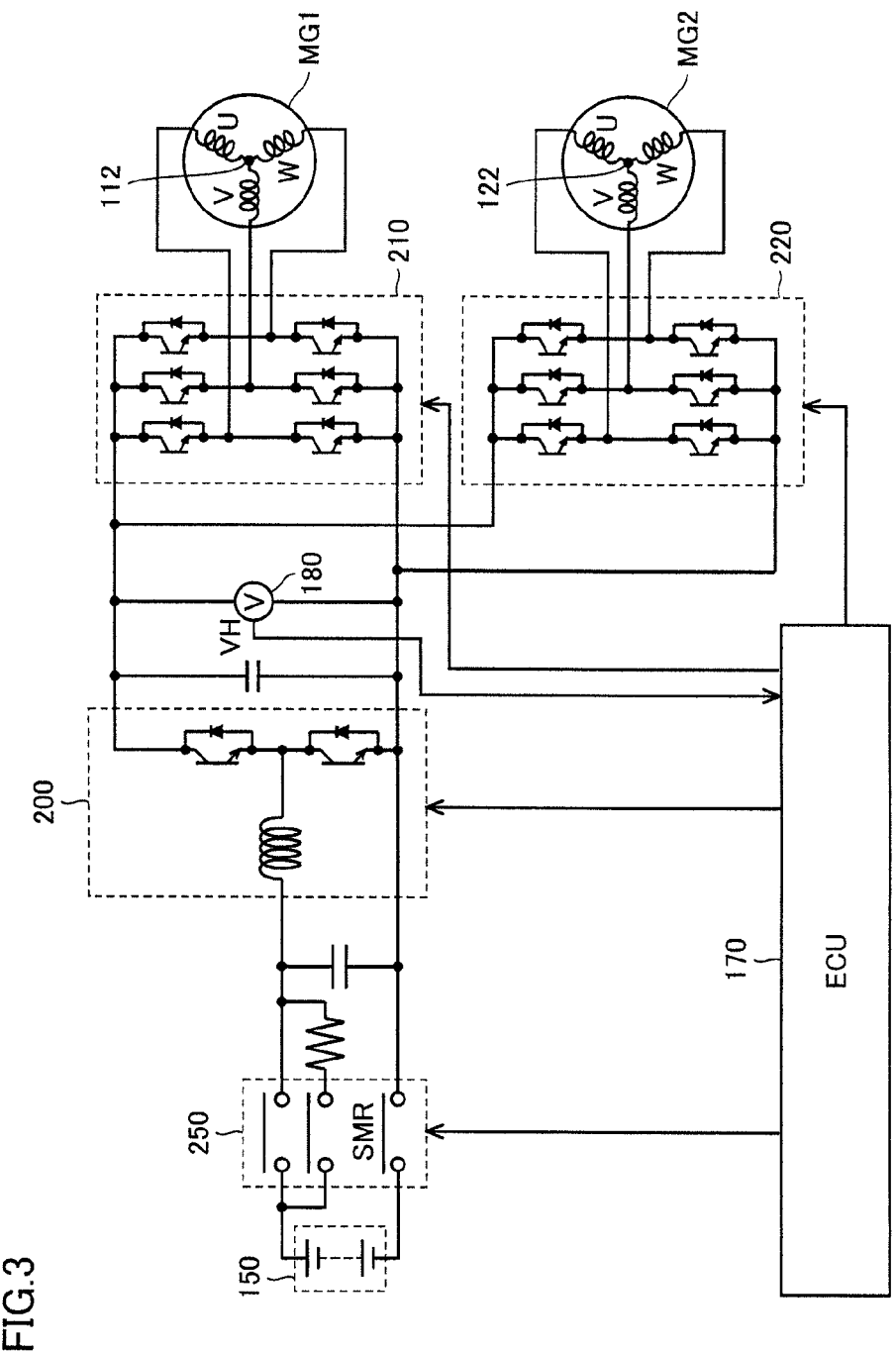
FIG. 3 is a circuit diagram showing a configuration of an electric system for driving a motor generator shown in FIG. 1.

FIG. 3 shows a configuration of an electric system for driving MG1, MG2 shown in FIG. 1.

Referring to FIG. 3, the hybrid car is provided with a converter 200, a first inverter 210 corresponding to MG1, a second inverter 220 corresponding to MG2, and an SMR (System Main Relay) 250.

Converter 200 includes a reactor, two power semiconductor switching elements (hereinafter simply also referred to as a "switching element") connected in series, an anti-parallel diode provided in correspondence with each switching element, and a reactor. For a power semiconductor switching element, an IGBT (Insulated Gate Bipolar Transistor), a power MOS (Metal Oxide Semiconductor) transistor, a power bipolar transistor, and the like can be adopted as appropriate. The reactor has one end connected to a positive electrode side of battery 150 and the other end connected to a point of connection between the two switching elements. On and off of each switching element is controlled by ECU 170.

In supplying power discharged from battery 150 to MG1 or MG2, a voltage is up-converted by converter 200. In contrast, in charging battery 150 with power generated by MG1 or MG2, a voltage is down-converted by converter 200.

A system voltage VH between converter 200 and first inverter 210 and second inverter 220 is detected by a voltage sensor 180. A result of detection by voltage sensor 180 is transmitted to ECU 170.

First inverter 210 is implemented by a general three-phase inverter and includes a U-phase arm, a V-phase arm, and a W-phase arm connected in parallel. The U-phase arm, the V-phase arm, and the W-phase arm each have two switching elements (an upper arm element and a lower arm element) connected in series. An anti-parallel diode is connected to each switching element.

MG1 has a U-phase coil, a V-phase coil, and a W-phase coil that are star-connected, as a stator winding. One ends of the coils of the respective phases are connected to one another at a neutral point 112. The other ends of the coils of the respective phases are connected to points of connection between the switching elements of the arms of the respective phases of first inverter 210.

While the vehicle runs, first inverter 210 controls a current or a voltage of the coil of each phase of MG1, such that MG1 operates in accordance with an operation command value (representatively, a torque command value) set for generating output (vehicle drive torque, power generation torque, or the like) requested for running of the vehicle. First inverter 210 can carry out bidirectional power conversion including a power conversion operation for converting direct-current power supplied from battery 150 into alternating-current power for supply to MG1 and a power conversion operation for converting alternating-current power generated by MG1 into direct-current power.

Similarly to first inverter 210, second inverter 220 is implemented by a general three-phase inverter. Similarly to MG1, MG2 has a U-phase coil, a V-phase coil, and a W-phase coil that are star-connected, as a stator winding. One ends of the coils of the respective phases are connected to one another at a neutral point 122. The other ends of the coils of the respective phases are connected to points of connection between the switching elements of the arms of the respective phases of second inverter 220.

While the vehicle runs, second inverter 220 controls a current or a voltage of the coil of each phase of MG2, such that MG2 operates in accordance with an operation command value (representatively, a torque command value) set for generating output (vehicle drive torque, regenerative braking torque, or the like) requested for running of the vehicle. Second inverter 220 can also carry out bidirectional power conversion including a power conversion operation for converting direct-current power supplied from battery 150 into alternating-current power for supply to MG2 and a power conversion operation for converting alternating-current power generated by MG2 into direct-current power.

SMR 250 is provided between battery 150 and converter 200. As SMR 250 is opened, battery 150 is disconnected from an electric system. On the other hand, as SMR 250 is closed, battery 150 is connected to the electric system. A state of SMR 250 is controlled by ECU 170. For example, SMR 250 is closed in response to an operation to turn on a power-on switch (not shown) indicating system start-up of the hybrid car, whereas SMR 250 is opened in response to an operation to turn off the power-on switch.

Figure 4:
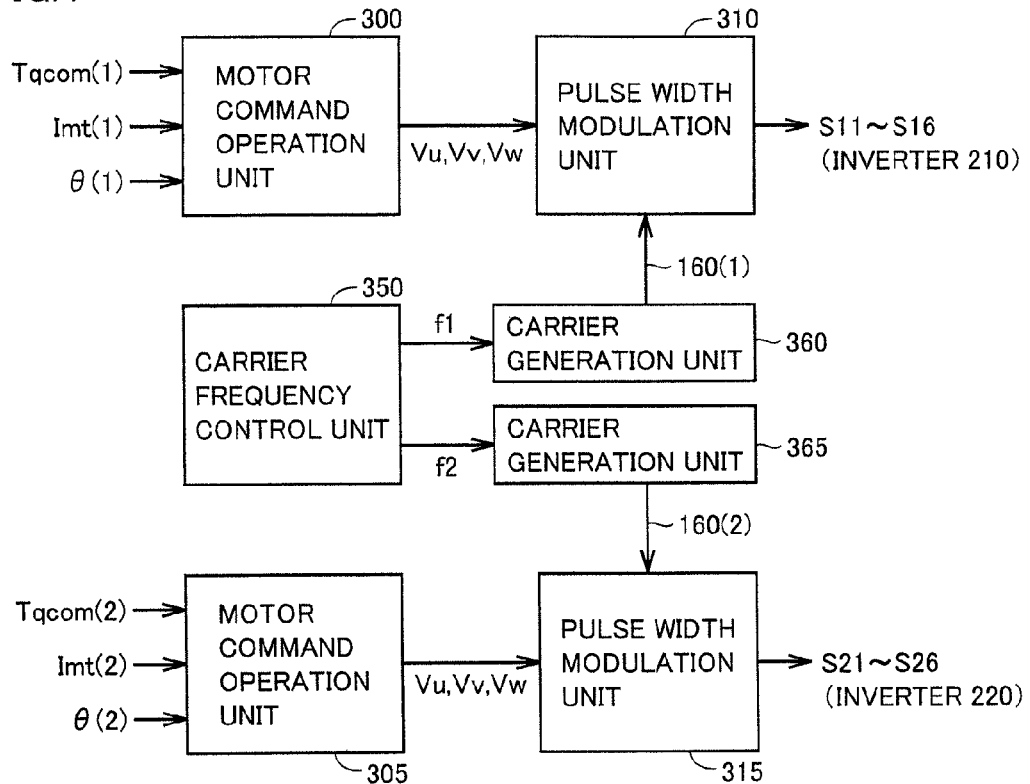
FIG. 4 is a functional block diagram of the device for controlling a motor according to the embodiment of the present invention.

FIG. 4 is a functional block diagram of the device for controlling a motor according to the embodiment of the present invention. Each functional block shown in FIG. 4 may be realized by configuring a circuit (hardware) having a function corresponding to the block in ECU 170 or realized as ECU 170 performs software processing in accordance with a program set in advance.

Referring to FIG. 4, ECU 170 includes motor command operation units 300, 305, pulse width modulation units 310, 315, a carrier frequency control unit 350, and carrier generation units 360, 365.

Motor command operation unit 300 operates a control command for first inverter 210 based on MG1 feedback control. Here, the control command is a command value for a voltage or a current to be supplied to MG1, MG2, that is controlled by each inverter 210, 220. In the following, voltage commands Vu, Vv, Vw of the respective phases for MG1, MG2 are exemplified as the control commands. For example, motor command operation unit 300 controls output torque of MG1 based on feedback of a current Imt(1) of each phase of MG1. Specifically, motor command operation unit 300 sets a current command value corresponding to a torque command value Tqcom(1) of MG1 and generates voltage commands Vu, Vv, Vw in accordance with difference between the current command value and motor current Imt(1). Here, control operation accompanying coordinate transformation (representatively, dq axis transformation) with the use of a rotation angle θ(1) of MG1 is generally employed.

Similarly to motor command operation unit 300, motor command operation unit 305 generates a control command for second inverter 220, specifically, voltage commands Vu, Vv, Vw of the respective phases of MG2, based on MG2 feedback control. Namely, voltage commands Vu, Vv, Vw are generated based on a motor current Imt(2), a rotation angle θ(2), and a torque command value Tqcom(2) of MG2.

Pulse width modulation unit 310 generates control signals S11 to S16 for the switching elements in first inverter 210, based on a carrier signal 160(1) from carrier generation unit 360 and voltage commands Vu, Vv, Vw from motor command operation unit 300. Control signals S11 to S16 control on and off of the six switching elements constituting the upper and lower arms of the U-phase, the V-phase, and the W-phase of first inverter 210.

Similarly, pulse width modulation unit 315 generates control signals S21 to S26 for the switching elements in second inverter 220, based on a carrier signal 160(2) from carrier generation unit 365 and voltage commands Vu, Vv, Vw from motor command operation unit 305. Control signals S21 to S26 control on and off of the six switching elements constituting the upper and lower arms of the U-phase, the V-phase, and the W-phase of second inverter 220.

Pulse width modulation units 310, 315 carry out PWM control for comparing a carrier signal 160 (collective denotation of 160(1) and 160(2)) with voltage commands Vu, Vv, Vw.

Figure 5:
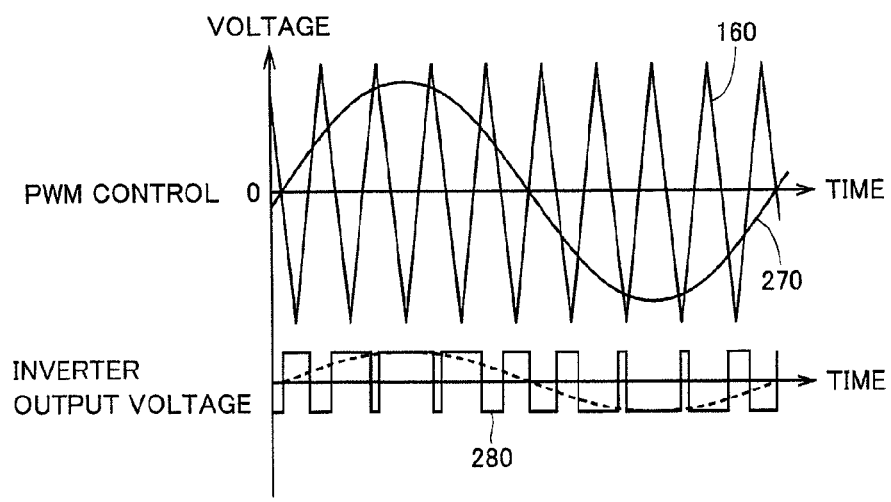
FIG. 5 is a waveform diagram illustrating PWM control by a pulse width modulation unit shown in FIG. 4.

FIG. 5 is a waveform diagram illustrating PWM control by pulse width modulation units 310, 315.

Referring to FIG. 5, in PWM control, on and off of the switching elements of the respective phases of the inverter is controlled based on comparison of a voltage between carrier signal 160 and a voltage command 270 (collective denotation of voltage commands Vu, Vv, Vw). Consequently, a pulse width modulation voltage 280 serving as a pseudo sine wave voltage to each phase is applied to a coil winding of each phase of MG1, MG2. Carrier signal 160 can be constructed by a periodic triangular wave or sawtooth wave.

Referring again to FIG. 4, carrier frequency control unit 350 controls carrier frequency f1 used for PWM control in first inverter 210 and a carrier frequency f2 used for PWM control in second inverter 220.

Carrier generation unit 360 generates carrier signal 160(1) in accordance with carrier frequency f1 set by carrier frequency control unit 350. Carrier generation unit 360 generates carrier signal 160(2) in accordance with carrier frequency f2 set by carrier frequency control unit 350.

Namely, respective frequencies of carrier signals 160(1) and 160(2) vary in accordance with carrier frequencies f1 and f2 set by carrier frequency control unit 350. Consequently, a switching frequency under PWM control in first inverter 210 and second inverter 220 is controlled by carrier frequency control unit 350.

In inverter 210, 220, a not-shown switching element is turned on and off in accordance with a carrier frequency. Therefore, a harmonic current (a ripple current) in accordance with the switching frequency is superimposed on a current supplied from inverter 210, 220 to MG1, MG2. Thus, electromagnetic force acting on MG1, MG2 fluctuates at a frequency in accordance with the switching frequency.

Meanwhile, equipment mounted on a hybrid car, which is represented by MG1, MG2, forms a plurality of mechanical oscillation systems based on combination of mass elements and spring elements. For example, in MG1, MG2, a mechanical oscillation system including a rotor as a mass element and including a support bearing as a spring element and a mechanical oscillation system constituted of a stator and a case are present. In addition, a mechanical oscillation system is constituted also of a not-shown transmission case and the like. These mechanical oscillation systems oscillate as external force is applied or oscillation is transferred, so that they generate sound as they vibrate air.

In MG1, MG2, as electromagnetic force acting between the stator and the rotor periodically fluctuates in accordance with a carrier frequency, oscillation caused by the carrier frequency occurs in a mechanical oscillation system constituted of a rotor and a stator. Since this oscillation is further transmitted also to other mechanical oscillation systems, oscillation of these mechanical oscillation systems will generate sound (what is called electromagnetic noise).

Here, each mechanical oscillation system has a natural resonant frequency. Since oscillation caused by the resonant frequency is less likely to attenuate, amplitude of oscillation becomes great, which also results in loud generated sound. The resonant frequency is a natural value determined by a shape, a mass, rigidity, and the like of equipment implementing the mechanical oscillation system. The resonant frequency can be found by design simulation through actual equipment experiments or CAE (Computer Aided Engineering). In addition, the resonant frequency can also be adjusted to some extent through design of a shape, a mass, rigidity, and the like of equipment.

Thus, in an electrically powered vehicle represented by a hybrid car, a plurality of mechanical resonance systems are formed by equipment mounted thereon, and at least a part thereof oscillates as a result of oscillation (electromagnetic oscillation) originating from the carrier frequency, to thereby generate noise (electromagnetic noise). This noise is output to the outside of the vehicle as operating sound of the electrically powered vehicle.

Figure 6:
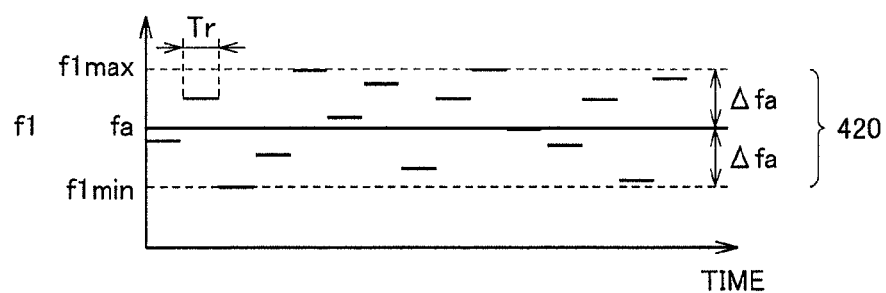
FIG. 6 is a conceptual diagram illustrating control of a carrier frequency in each inverter.

FIG. 6 is a conceptual diagram illustrating carrier frequency control (hereinafter also referred to as "random carrier control") in each inverter 210, 220 by the device for controlling a motor according to the embodiment of the present invention. FIG. 6 exemplifies control of carrier frequency f1 of inverter 210.

Referring to FIG. 6, carrier frequency control unit 350 changes carrier frequency f1 within a prescribed frequency range 420 in a constant period or a random period as the time elapses. A central value of frequency range 420 is denoted as fa, an upper limit value f1 max is defined as fa+Δfa, and a lower limit value f1min is defined as fa−Δfa. Carrier frequency f1 is changed each time a period of change Tr elapses. In a case where Tr is set to a fixed value, the carrier frequency fluctuates in a constant period, and the carrier frequency changes in a random period as Tr is varied.

Figure 7:
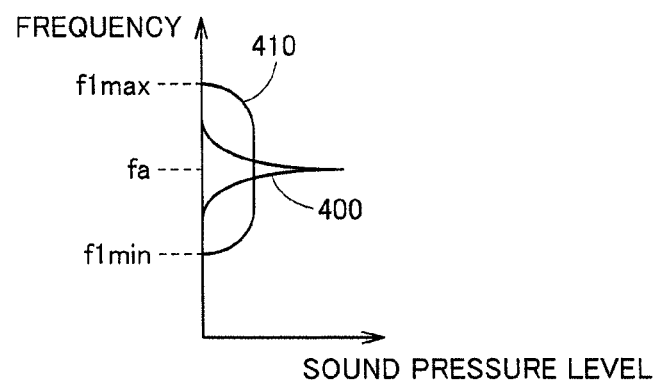
FIG. 7 is a conceptual diagram showing distribution of sound pressure levels of electromagnetic noise in random carrier control shown in FIG. 6.

FIG. 7 is a conceptual diagram showing distribution of sound pressure levels of electromagnetic noise in random carrier control shown in FIG. 6.

Referring to FIG. 7, a sign 400 shows distribution of frequencies of sound pressure levels in a case where carrier frequency f1 is fixed to fa. In this case, since the sound pressure level of a fixed frequency corresponding to central frequency fa becomes high, noise at that frequency is likely to be sensed by a user.

On the other hand, a sign 410 shows distribution of frequencies of sound pressure levels in a case where carrier frequency f1 is caused to fluctuate within a frequency range from lower limit value f1min to upper limit value f1max as shown in FIG. 6. If a level of electromagnetic noise generated at each carrier frequency is constant, sound at uniform intensity in the frequency range is recognized by the sense of hearing of a person by shortening a period of change in carrier frequency (for example, Tr=approximately 2 to 10 [ms]). Consequently, since sound pressure levels can be distributed within that frequency region as shown with sign 410, the sound pressure level of noise can be lowered.

Thus, in general, electromagnetic noise generated under motor control by the inverter can be lowered through random carrier control. It is noted that a frequency fluctuation pattern is set in advance such that an average value of the carrier frequencies converges at central frequency fa while random carrier control is being carried out.

Figure 8:
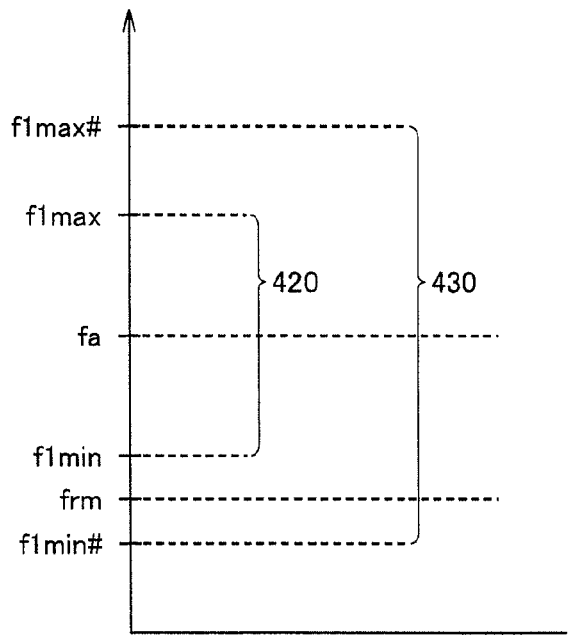
FIG. 8 is a conceptual diagram illustrating random carrier control according to the embodiment of the present invention.

FIG. 8 is a conceptual diagram illustrating random carrier control according to the embodiment of the present invention.

Referring to FIG. 8, during normal operation, carrier frequency control unit 350 periodically or randomly changes carrier frequency f1 within prescribed frequency range 420 (f1min to f1max) with frequency fa being defined as the center.

On the other hand, while the vehicle speed is low, carrier frequency control unit 350 periodically or randomly changes carrier frequency f1 within a prescribed frequency range 430 with frequency fa being defined as the center. A lowest frequency in frequency range 430 is denoted as f1min# (f1min#<f1min) and a highest frequency is denoted as f1max# (f1max#>f1max).

Thus, frequency range 430 is wider than frequency range 420 and central frequency fa thereof is set substantially equal to that of frequency range 420. Preferably, central frequency fa is common to frequency ranges 420 and 430. Consequently, an average value of carrier frequencies f1 when random carrier control is carried out based on frequency range 430 (while the vehicle speed is low) is equivalent to that in random carrier control based on frequency range 420 (during normal operation).

As described above, a plurality of mechanical resonance systems are present in a hybrid car (an electrically powered vehicle) and the respective mechanical resonance systems have natural resonant frequencies dependent on their mechanical structures (a shape, a mass, rigidity, and the like).

Therefore, by carrying out random carrier control with the range being expanded from frequency range 420 to frequency range 430, the carrier frequency is expected to fluctuate across a greater number of resonant frequencies. Namely, by causing electromagnetic oscillation at the resonant frequency, increase in electromagnetic noise (generated sound) as a whole can be expected. Consequently, during normal operation, random carrier control is carried out so as to lower electromagnetic noise, however, while the vehicle speed is low, random carrier control can be carried out so that vehicle operating sound is increased by electromagnetic noise.

Preferably, frequency range 420, 430 is set in advance such that frequency range 420 does not include a resonant frequency frm but frequency range 430 includes resonant frequency frm, with attention being paid to resonant frequency frm of a specific mechanical oscillation system at which generated sound at the resonant frequency is high. Thus, electromagnetic noise (generated sound) while the vehicle speed is low, under random carrier control, can more effectively be made louder than during normal operation.

Although different depending on a construction of a hybrid car (an electrically powered vehicle), for example, a mechanical oscillation system in a rotor of MG1, MG2 or a mechanical oscillation system constituted of a stator and a motor case to which oscillation is transmitted, each of which serves as an oscillation source due to fluctuation in electromagnetic force caused by the carrier frequency, are applicable as this specific mechanical oscillation system. Namely, frequency range 420, 430 can be determined based on the resonant frequencies of these mechanical oscillation systems.

Alternatively, in consideration of the fact that it is difficult to accurately grasp resonant frequencies (including frm) of a plurality of existing mechanical oscillation systems, frequency range 420, 430 can also be determined based on a result of measurement of operating sound when random carrier control is actually carried out, that is, based on actual equipment experiments.

Further, an average value of carrier frequencies f1 when random carrier control is carried out based on frequency range 430 (while the vehicle speed is low) is equivalent to that when random carrier control is carried out based on frequency range 420 (during normal operation). Therefore, since the carrier frequency is not lowered in a fixed manner as in PTL 2 under carrier frequency control for increasing operating sound of the hybrid car (electrically powered vehicle), lowering in efficiency of the motor and poorer fuel efficiency can be avoided.

Though control of carrier frequency f1 has been described above, random carrier control similar to that for carrier frequency f1 is applicable also to carrier frequency f2. It is noted that carrier frequency f1 and carrier frequency f2 may be the same or different from each other in frequency. In addition, frequency range 420 (during normal operation) and frequency range 430 (while the vehicle speed is low) may also be the same or different between carrier frequencies f1 and f2.

Figure 9:
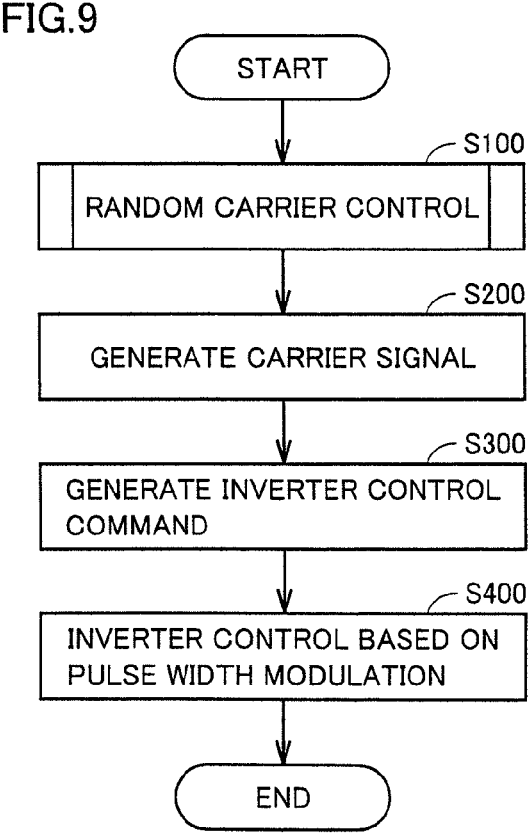
FIG. 9 is a first flowchart illustrating a processing procedure in a method for controlling a motor according to the embodiment of the present invention.

FIG. 9 is a first flowchart illustrating a processing procedure in a method for controlling a motor according to the embodiment of the present invention.

Referring to FIG. 9, in step S100, ECU 170 carries out random carrier control for determining a carrier frequency in inverter 210, 220.

Figure 10:
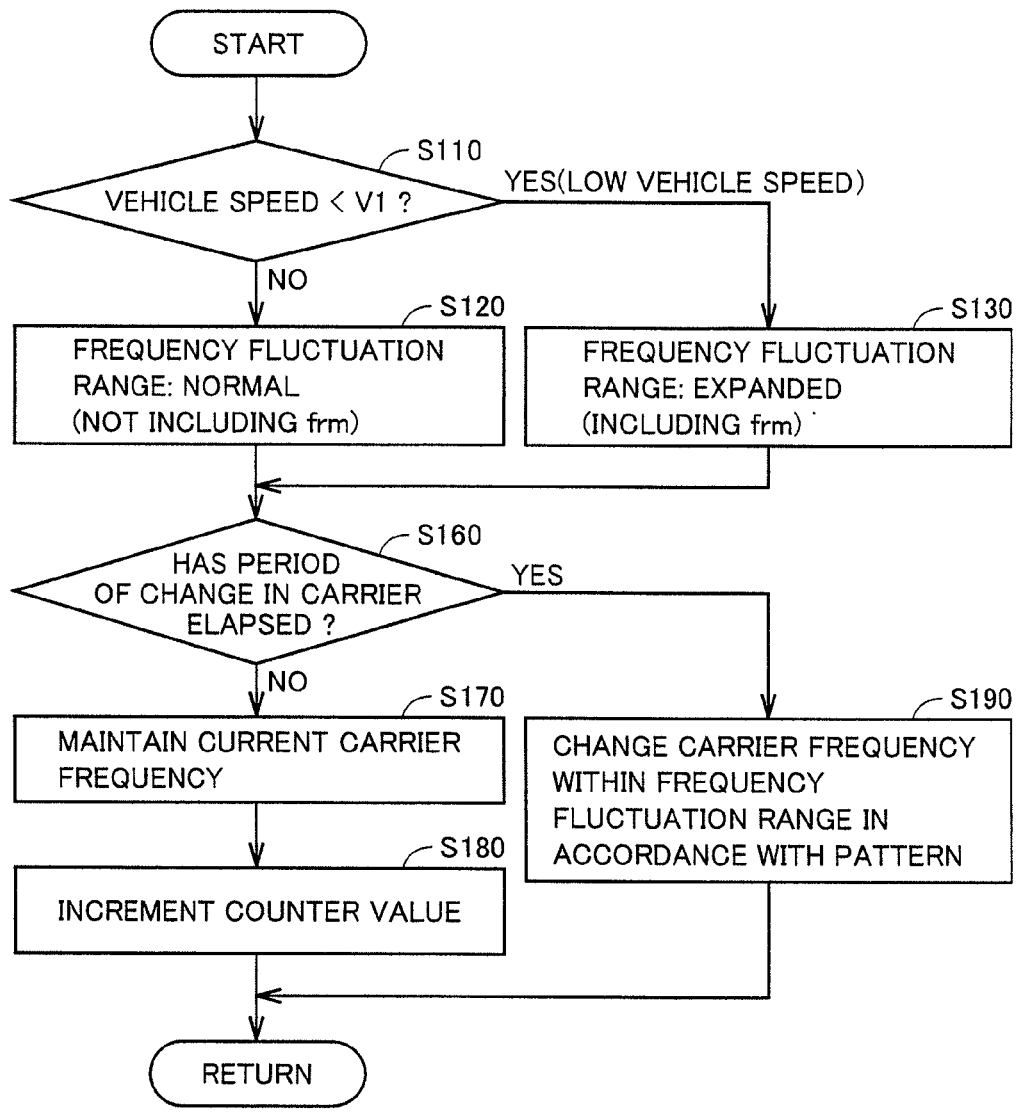
FIG. 10 is a second flowchart illustrating a processing procedure in motor control according to the embodiment of the present invention.

FIG. 10 is a flowchart illustrating details of a control processing procedure in step S100 in FIG. 9.

Referring to FIG. 10, in step S110, ECU 170 determines whether a vehicle speed of the hybrid car (electrically powered vehicle) is lower than a prescribed speed V1 or not. While the vehicle speed is low, that is, when the vehicle speed is lower than V1 (determination as YES is made in S110), ECU 120 sets frequency range 430 (FIG. 8) as a carrier frequency fluctuation range in step S130. On the other hand, during normal operation, that is, when determination as NO is made in S110, ECU 170 sets frequency range 420 in FIG. 8 as a carrier frequency fluctuation range in step S130. Consequently, while the vehicle speed is low, a frequency variation range under random carrier control is expanded as compared with that during the normal operation.

In step S160, ECU 170 determines whether a period of change in carrier frequency (Tr in FIG. 6) has elapsed or not. Until the period of change in carrier elapses (determination as NO is made in S160), ECU 170 maintains the current carrier frequency in step S170 and increments a counter value in step S180. When the counter value reaches a value corresponding to period of change in carrier Tr, ECU 170 makes determination as YES in step S160.

When the period of change in carrier elapses (determination as YES is made in S160), ECU 170 changes in step S190 the carrier frequency such that the carrier frequency fluctuates within frequency range 420 or 430 determined in steps S110 to S130. Here, the counter value in step S180 is cleared.

Carrier frequency f1 in first inverter 210 and carrier frequency f2 in second inverter 220 are thus determined in step S100 (S110 to S180). Namely, processing in step S100 (S110 to S180) corresponds to the function of carrier frequency control unit 350 in FIG. 4.

In step S200, ECU 170 generates carrier signal 160(1), 160(2) in accordance with carrier frequency f1, f2 determined in step S100. Namely, processing in step S200 corresponds to the function of carrier generation unit 360, 365 in FIG. 4.

In step S300, ECU 170 operates a control command for first inverter 210 and second inverter 220. Representatively, voltage commands Vu, Vv, Vw for the respective phases of the inverter are operated as the control commands. Namely, the operation in step S300 can be performed similarly to motor command operation unit 300, 305 in FIG. 4.

In step S400, ECU 170 generates a signal for controlling on and off of a switching element in first inverter 210 under PWM control for comparing the control command for first inverter 210 with carrier signal 160(1). In step S400, further, a signal for controlling on and off of a switching element in second inverter 220 is generated under PWM control for comparing the control command for second inverter 220 with carrier signal 160(2). Namely, processing in step S400 can be performed similarly to pulse width modulation unit 310, 315 in FIG. 4.

By repeating processing in steps S100 to S400 in a prescribed cycle, PWM control in first inverter 210 and second inverter 220 controlling MG1, MG2 can be carried out, by using a carrier frequency in accordance with random carrier control in FIGS. 6 and 8.

As described above, according to motor control in the embodiment of the present invention, during a period in which the vehicle speed is low, including start and stop of the vehicle, electromagnetic noise can be made louder by expanding the frequency range in random carrier control. Since the operating sound output to the outside of the vehicle can thus be made louder, an effect of notifying the surrounding of the electrically powered vehicle of a vehicle approaching can be enhanced while the vehicle speed is low. Then, since an average value of the carrier frequencies does not lower here, the operating sound can be made louder without lowering in fuel efficiency caused by lowering in efficiency of the motor as in PTL 2.

It is noted that, in PTL 2, only when an obstacle such as a pedestrian is sensed by an obstacle sensor such as a millimeter wave radar, an infrared sensor, and an ultrasonic sensor, a carrier frequency is lowered in order to increase electromagnetic noise. Thus, it is understood that PTL 2 can mitigate lowering in fuel efficiency involved with lowering in carrier frequency. In contrast, according to motor control in the embodiment of the present invention, fuel efficiency is prevented from becoming poorer due to control for increasing electromagnetic noise (operating sound of the vehicle) (expansion of the frequency range in random carrier control). Therefore, since there is no concern about lowering in fuel efficiency in spite of higher frequency of application of such control, an obstacle sensor as in PTL 2 is not required and operating sound of the electrically powered vehicle can be made louder during a period in which the vehicle speed is low, that is, when an effect of notifying the surrounding of the electrically powered vehicle of a vehicle approaching is preferably enhanced.

It is noted that start-up/stop of engine 100 may further be reflected in determination in step S110 (FIG. 10) in a hybrid car incorporating engine 100. Specifically, since operating sound emitted to the outside of the car is loud to some extent at the time when engine 100 is started, determination as NO may be made in S110 even while the vehicle speed is low.

(Variation)

Figure 11:
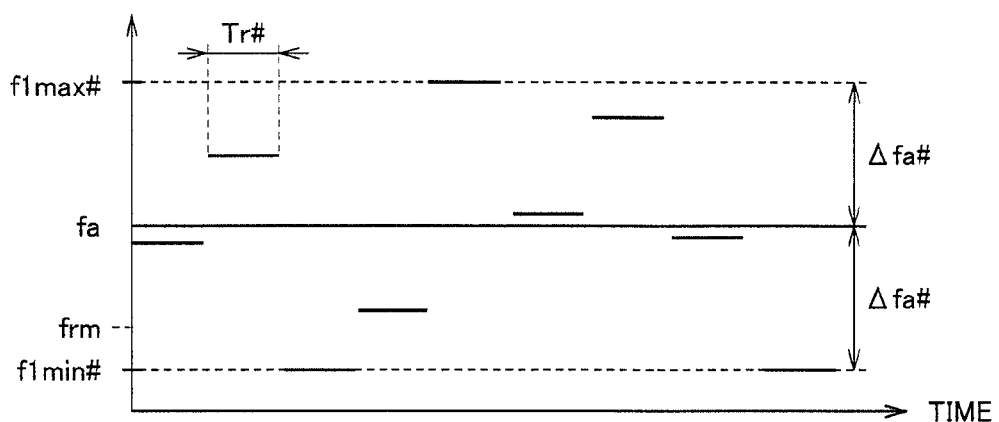
FIG. 11 is a conceptual diagram illustrating random carrier control according to a variation of the embodiment of the present invention.

FIG. 11 is a conceptual diagram illustrating random carrier control according to a variation of the embodiment of the present invention.

Referring to FIG. 11, in the variation of the embodiment of the present invention, in random carrier control while the vehicle speed is low, not only a carrier frequency range (f1min# to f1max#) is expanded as shown in FIG. 8 but also a period of change in carrier Tr# is extended as compared with that during normal operation (Tr in FIG. 6). Namely, in random carrier control, a period of change in carrier to be fixed or varied (Tr#>Tr) becomes longer than that during the normal operation.

Figure 12:
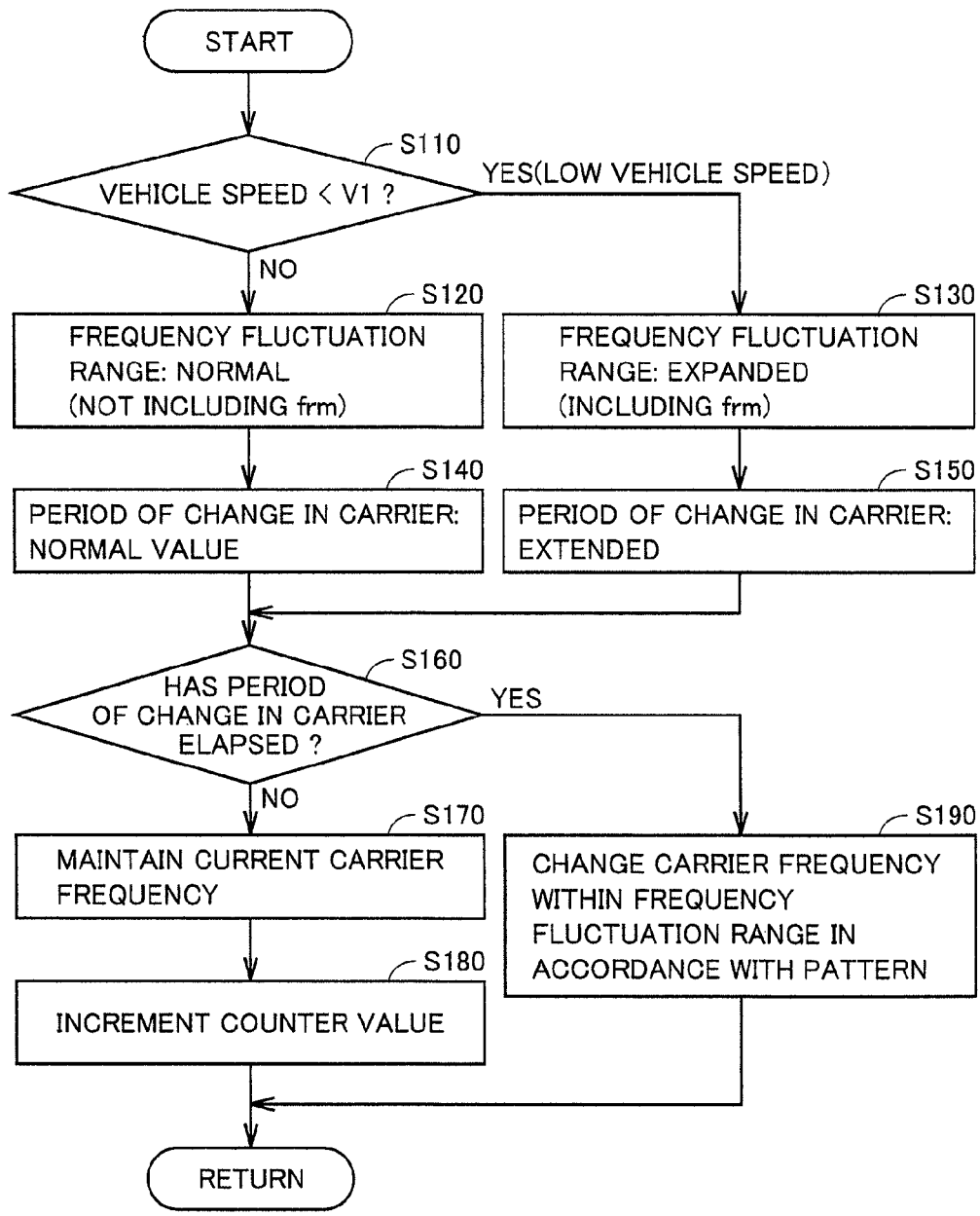
FIG. 12 is a flowchart illustrating a processing procedure in motor control according to the variation of the embodiment of the present invention.

FIG. 12 is a flowchart illustrating a processing procedure in a method for controlling a motor according to the variation of the embodiment of the present invention.

In the variation of the embodiment of the present invention, the configuration in step S100 in FIG. 9 is changed from FIG. 10 to FIG. 12. Since the construction of the hybrid car and motor control are otherwise the same as described above, detailed description will not be repeated.

Referring to FIG. 12, during normal operation (determination as NO is made in step S110), ECU 170 sets frequency range 420 as a frequency variation width in random carrier control and sets the period of change in carrier in accordance with a normal value Tr in step S120.

In contrast, while the vehicle speed is low (determination as YES is made in S110), ECU 170 expands the frequency variation width in random carrier control to frequency range 430 in step S130 and extends the period of change in carrier as compared with that during the normal operation in step S150. Namely, the period of change in carrier is extended from Tr to Tr#.

Then, in steps S160 to S170, ECU 170 causes the carrier frequency to fluctuate in accordance with period of change in carrier Tr or Tr# set in S140 (during normal operation) or step S150 (while the vehicle speed is low).

By thus extending the period of change in carrier frequency, an effect of mitigation of electromagnetic noise caused by random carrier control shown in FIG. 7 is weakened. Consequently, operating sound output to the outside of the vehicle can be made further louder by making electromagnetic noise while the vehicle speed is low further louder.

Though a hybrid car having the construction in FIG. 1 has been exemplified in the present embodiment as an electrically powered vehicle to which motor control according to the present invention is applied, application of the present invention is not limited to such an example. Namely, so long as a motor (motor generator) in a drive system controlled as accompanied by carrier frequency control is mounted, the present invention is applicable to any electrically powered vehicle such as a hybrid car having a construction in a drive system different from that in FIG. 1, an electric car not incorporating an engine, or a fuel cell car.

In addition, the number of motors (motor generators) is not particularly limited either, and the present invention is described, for confirmation purpose, as applicable to an electrically powered vehicle incorporating a single motor or three or more motors.

Moreover, though an inverter has been exemplified as a power converter to be subjected to PWM control in the present embodiment, application of the present invention is not limited to such a case. Namely, switching frequency control according to the present embodiment is also similarly applicable to a configuration where a power converter other than an inverter, such as a converter, is subjected to PWM control.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Industrial Applicability

This invention is applicable to control using a carrier signal, for a motor mounted on an electrically powered vehicle.

Reference Signs List 100 engine; 110 motor generator (MG1); 112, 122 neutral point; 120 motor generator (MG2); 130 power split device; 140 reduction gear; 150 battery; 160(1), 160(2) carrier signal; 180 voltage sensor; 190 drive wheel; 200 converter; 210 inverter (MG1); 220 inverter (MG2); 270, Vu, Vv, Vw voltage command (each phase); 280 pulse width modulation voltage; 300, 305 motor command operation unit; 310, 315 pulse width modulation unit; 350 carrier frequency control unit; 360, 365 carrier generation unit; 420 frequency range (during normal operation); 430 frequency range (while vehicle speed is low); Imt(1), Imt(2) motor current; S11 to S16, S21 to S26 control signal (inverter); Tqcom torque command value; Tr period of change in carrier (during normal operation); Tr# period of change in carrier (while vehicle speed is low); V1 prescribed speed; VH system voltage; f1, f2 carrier frequency; fa central frequency; and frm resonant frequency (specific mechanical oscillation system).

The invention claimed is:

1. A device for controlling a motor mounted on an electrically powered vehicle, comprising:

a motor command operation unit for generating a control command for a voltage or a current to be supplied to said motor from a power converter configured to include at least one switching element;

a carrier generation unit for generating a carrier signal used for controlling said power converter;

a carrier frequency control unit for such control that frequencies of a plurality of carrier signals generated by said carrier generation unit are caused to fluctuate within a first frequency range with a prescribed frequency being defined as a center while a vehicle speed of said electrically powered vehicle is higher than a prescribed speed and the frequencies are caused to fluctuate within a second frequency range with said prescribed frequency being defined as the center while said vehicle speed is lower than said prescribed speed; and a pulse width modulation unit for controlling on and off of said switching element in said power converter based on comparison between said control command from said motor command operation unit and said carrier signal from said carrier generation unit, equipment mounted on said electrically powered vehicle forming a plurality of mechanical oscillation systems which generate sound as a result of oscillation by electromagnetic oscillation originating from said carrier signal, and said first and second frequency ranges being set such that sound generated from said plurality of mechanical oscillation systems when the frequency of said carrier signal fluctuates within said second frequency range is louder than sound generated from said plurality of mechanical oscillation systems when said carrier frequency fluctuates within said first frequency range.

2. The device for controlling a motor according to claim 1, wherein said carrier frequency control unit causes the frequency of said carrier signal to fluctuate within said first frequency range in accordance with a first period of change when the vehicle speed of said electrically powered vehicle is higher than the prescribed speed and causes the frequency of said carrier signal to fluctuate within said second frequency range in accordance with a second period of change when the vehicle speed of said electrically powered vehicle is lower than the prescribed speed, and said second period of change is longer than said first period of change.

3. The device for controlling a motor according to claim 1, wherein
said first and second frequency ranges are set such that at least any resonant frequency of said plurality of mechanical oscillation systems is out of said first frequency range and within said second frequency range.

4. A method for controlling a motor mounted on an electrically powered vehicle, comprising the steps of:
controlling frequencies of a plurality of carrier signals used for control of a power converter configured to include at least one switching element;
generating said carrier signal in accordance with a carrier frequency determined in said step of controlling;
generating a control command for a voltage or a current to be supplied from said power converter to said motor; and
generating a signal for controlling on and off of said switching element based on comparison between said control command and said carrier signal,
said step of controlling including the steps of
causing said carrier frequency to fluctuate within a first frequency range with a prescribed frequency being defined as a center while a vehicle speed of said electrically powered vehicle is higher than a prescribed speed, and
causing said carrier frequency to fluctuate within a second frequency range with said prescribed frequency being defined as the center while said vehicle speed is lower than said prescribed speed,
said electrically powered vehicle incorporating a plurality of pieces of equipment having a mechanism serving as a sound source based on mechanical oscillation, and
said first and second frequency ranges being set such that sound generated from said plurality of pieces of equipment when said carrier frequency fluctuates within said second frequency range is louder than sound generated from said plurality of pieces of equipment when said carrier frequency fluctuates within said first frequency range.

5. The method for controlling a motor according to claim 4, wherein
said step of controlling includes the steps of
causing said carrier frequency to fluctuate within said first frequency range in accordance with a first period of change while the vehicle speed of said electrically powered vehicle is higher than the prescribed speed, and
causing said carrier frequency to fluctuate within said second frequency range in accordance with a second period of change while said vehicle speed is lower than said prescribed speed, and
said second period of change is longer than said first period of change.

6. The method for controlling a motor according to claim 4, wherein
said first and second frequency ranges are set such that at least any resonant frequency of said plurality of pieces of equipment is out of said first frequency range and within said second frequency range.

* * * * *